(12) United States Patent
Schwartz

(10) Patent No.: US 8,772,203 B2
(45) Date of Patent: Jul. 8, 2014

(54) POLYMERIC GEL SYSTEM AND METHODS FOR MAKING AND USING SAME IN HYDROCARBON RECOVERY

(75) Inventor: Kevin M. Schwartz, Pittsburgh, PA (US)

(73) Assignee: Clearwater International, LLC, Houston, TX (US)

(*) Notice: Subject to any disclaimer, the term of this patent is extended or adjusted under 35 U.S.C. 154(b) by 0 days.

(21) Appl. No.: 13/606,251

(22) Filed: Sep. 7, 2012

(65) Prior Publication Data

US 2012/0329684 A1 Dec. 27, 2012

Related U.S. Application Data

(60) Division of application No. 11/760,581, filed on Jun. 8, 2007, now Pat. No. 8,273,693, which is a continuation-in-part of application No. 10/228,875, filed on Aug. 27, 2002, now abandoned.

(51) Int. Cl.
*C09K 8/68* (2006.01)
*E21B 43/267* (2006.01)

(52) U.S. Cl.
USPC ........... 507/128; 507/132; 507/138; 507/139; 507/235; 507/238; 507/240; 507/244; 507/245; 507/265; 507/266; 507/268; 166/280.2

(58) Field of Classification Search
None
See application file for complete search history.

(56) References Cited

U.S. PATENT DOCUMENTS

| 4,561,985 | A | * | 12/1985 | Glass, Jr. | 507/108 |
| 5,458,197 | A | * | 10/1995 | Chan | 166/304 |
| 6,627,183 | B1 | * | 9/2003 | Young et al. | 424/70.1 |
| 7,968,501 | B2 | * | 6/2011 | Parris | 507/261 |
| 2003/0125215 | A1 | * | 7/2003 | Schwartz et al. | 507/121 |
| 2003/0158269 | A1 | * | 8/2003 | Smith et al. | 516/98 |
| 2006/0269502 | A1 | * | 11/2006 | Johnson et al. | 424/70.13 |
| 2008/0103068 | A1 | * | 5/2008 | Parris | 507/261 |
| 2008/0202749 | A1 | * | 8/2008 | Schwartz et al. | 166/280.2 |

FOREIGN PATENT DOCUMENTS

WO    WO 0006102 A1 * 2/2000

* cited by examiner

*Primary Examiner* — John J Figueroa
(74) *Attorney, Agent, or Firm* — Robert W Strozier

(57) ABSTRACT

Coacervate gels having excellent shear viscosities and other properties are made with anionic or cationic polymers, a smaller amount of a surfactant having a charge opposite that of the polymer, and a hydrophobic alcohol and an effective amount of a phosphorus-containing compound sufficient to increase the viscosity of coacervate gels up to 3 times as compared to the gels in the absence of the phosphorus-containing compound. The Zeta Potential of the gel is maintained at an absolute value of at least 20. Optional gel promoting additives include betaines and amine oxides. A preferred gel comprises poly diallyl dimethyl ammonium chloride, a lesser amount of sodium lauryl sulfonate, and lauryl alcohol. The gels are particularly useful in well drilling fluids and well fracturing fluids.

10 Claims, 14 Drawing Sheets

POLYMERIC GEL SYSTEM AND METHODS FOR MAKING AND USING SAME IN HYDROCARBON RECOVERY

RELATED APPLICATIONS

This application is a divisional of U.S. patent application Ser. No. 11/760581, filed Jun. 8, 2007 now U.S. Pat. No. 8,273,693, which claims the full benefit of Provisional application No. 60/339,630, filed Dec. 12, 2001, and also the full benefit as a continuation-in-part of Nonprovisional application Ser. No. 10/228,875 filed Aug. 27, 2002 now abandoned titled "Polymeric Gel system and Use in hydrocarbon Recovery."

BACKGROUND OF THE INVENTION

1. Field of the Invention

Micellar combinations of cationic or anionic polymers and oppositely charged surfactants are made preferably with C6-23 alcohols in proportions coordinated in aqueous media with the aid of Zeta Potential measurements. The resulting gels are useful in drilling and formation fracturing in hydrocarbon recovery, manifesting excellent proppant suspending properties in low concentrations of polymer and surfactant as compared to the prior art.

In particularly, micellar combinations of cationic or anionic polymers and oppositely charged surfactants and further including an effective amount of a phosphorus-containing compound to sufficient to improve gel formation and stability are made preferably with C6-23 alcohols in proportions coordinated in aqueous media with the aid of Zeta Potential measurements and a phosphorus-containing compounds such as mono, di or tri carbyl phosphates or phosphate salts, which enhances gel viscosity, improved viscosity build up and improved viscoelastic properties such as stability.

2. Description of the Related Art

In U.S. Pat. No. 5,169,441, Lauzon suggests the use of Zeta Potential for characterizing particulates such as pigments treated with cationic polymers. Lauzon's U.S. Pat. No. 5,846,308 describes the stabilization of a rosin dispersion for use as a sizing composition by treating it with a "cationic colloidal coacervate" which may include both a cationic polymer and an anionic surfactant; the finished sizing composition is to have a Zeta Potential of at least 20 millivolts. Poly(diallyldimethyl ammonium chloride), sometimes known as poly-DADMAC, is the preferred cationic polymer. Also, Lauzon's U.S. Pat. No. 6,315,824 describes a similar coacervate stabilizing system used for hydrophobic non-rosin sizing agents, which may be liquid as well as solid. See also Lauzon's U.S. Pat. No. 4,507,210, which suggests a correlation of Zeta Potential to certain filtration properties in the treatment of shale and clay in hydrocarbon recovery; see also Engelmann et al in U.S. Pat. No. 5,196,401.

Other compositions comprising a cationic polymer and an anionic surfactant, often in high ratios of anionic surfactant to cationic polymer, may be found in Matz and LeMar U.S. Pat. No. 6,110,451, Verdicchio and Spilatro U.S. Pat. No. 4,948,576, and the shampoo and other personal care products described by Guskey et al in U.S. Pat. Nos. 6,297,203 and 6,221,817, Sako et al in U.S. Pat. No. 6,284,230, (which also describes betaines) Hoshowski et al in U.S. Pat. No. 5,137,715, and Snyder et al in U.S. Pat. No. 6,248,317.

In the field of hydrocarbon recovery from the earth, formation fracturing fluids proposed by Zhang in Canadian patent 2,257,699 combine anionic surfactants such as sodium xylene sulfonate and cationic surfactants such as N,N,N,trimethyl-1-octadecammonium chloride to make a gel said to be viscoelastic. Carbon dioxide is added to similar combinations in Zhang's Canadian patent 2,257,697 to generate a foam. Borchardt et al, in U.S. Pat. No. 4,409,110, describe formation flooding compositions which may comprise cationic polymers and anionic surfactants. Numerous combinations of surfactants and other compounds are proposed by Dahayanake et al in U.S. Pat. No. 6,258,859 (WO 98/56497; PCT/US/12067). See also the compositions said to be viscoelastic and proposed for well treatment by Hughes et al in U.S. Pat. No. 6,232,274 and Jones et al in U.S. Pat. No. 6,194,356.

Combinations of cationic polymers, betaines, and anionic surfactants may be inferred from the numerous combinations of materials that are possibly 25 viscoelastic within the disclosure of Balzer in U.S. Pat. No. 5,956,502, dealing with compositions for use on the hair and skin. See also the combination of cationic polymer with anionic surfactants for use as as an automatic dishwashing detergent, in Tartakovsky et al U.S. Pat. No. 6,281,180.

U.S. Pat. Nos. 7,205,262 and 7,183,239, which are also continuations-in-part of U.S. patent application Ser. No. 10/228,875, represent gellant system with other desirable properties, all incorporated herein by reference.

There remains a need for improved aqueous gels and methods of making them.

SUMMARY OF THE INVENTION

The entire specification, including description, claims, and drawings, of provisional application 60/339,630 filed Dec. 12, 2001 entitled "Cationic Polymeric Coacervates," is hereby incorporated by reference. Our invention includes aqueous gels, gel-forming compositions, methods of making them, and their use in well treatment.

In its most basic form, the novel composition comprises (a) a cationic or anionic polymer and (b) a lesser amount of an oppositely charged surfactant, in a ratio to provide a Zeta Potential of 20 millivolts or higher, or −20 millivolts or lower, (c) a small amount of a hydrophobic alcohol having 6 to 23 carbon atoms and (d) an effective amount of a phosphorus-containing compound sufficient to improve gel, reduce a gel time, improve gel stability and to improve gel viscosity up to 3, times compared to the gel in the absence of the phosphorus-containing compound, where the effective amount is between about 0.001 wt % and about 10 wt. %. In certain embodiments, the effective amount is between about 0.05 wt. % and about 3 wt. %. In certain embodiments, the effective amount is between about 0.05 wt. % and about 1 wt. %. In certain embodiments, the composition also includes a small amount of a gel promoter comprising one or more of (e) an amphoteric surfactant and/or (f) an amine oxide surfactant, while maintaining the same limits of Zeta Potential. The composition represents a polymer coacervate because the viscosifying properties of the polymer are controlled in coacervate form— that is, the long chain cationic or anionic polymer and the smaller amount of oppositely charged surfactant act in the presence of the hydrophobic alcohol to form a singular phase distinguished by a characteristic Zeta Potential. These properties are also modified by the small amount of a phosphorus-containing compound, which increases gellant viscosity, gellant viscosity build up and final gellant properties. This singular phase, under the prescribed Zeta Potential, is capable of imparting a significantly increased viscosity compared to other solutions of the same polymer at the same concentration, including such concentrations in the presence of higher and lower amounts of the same other additives or components.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
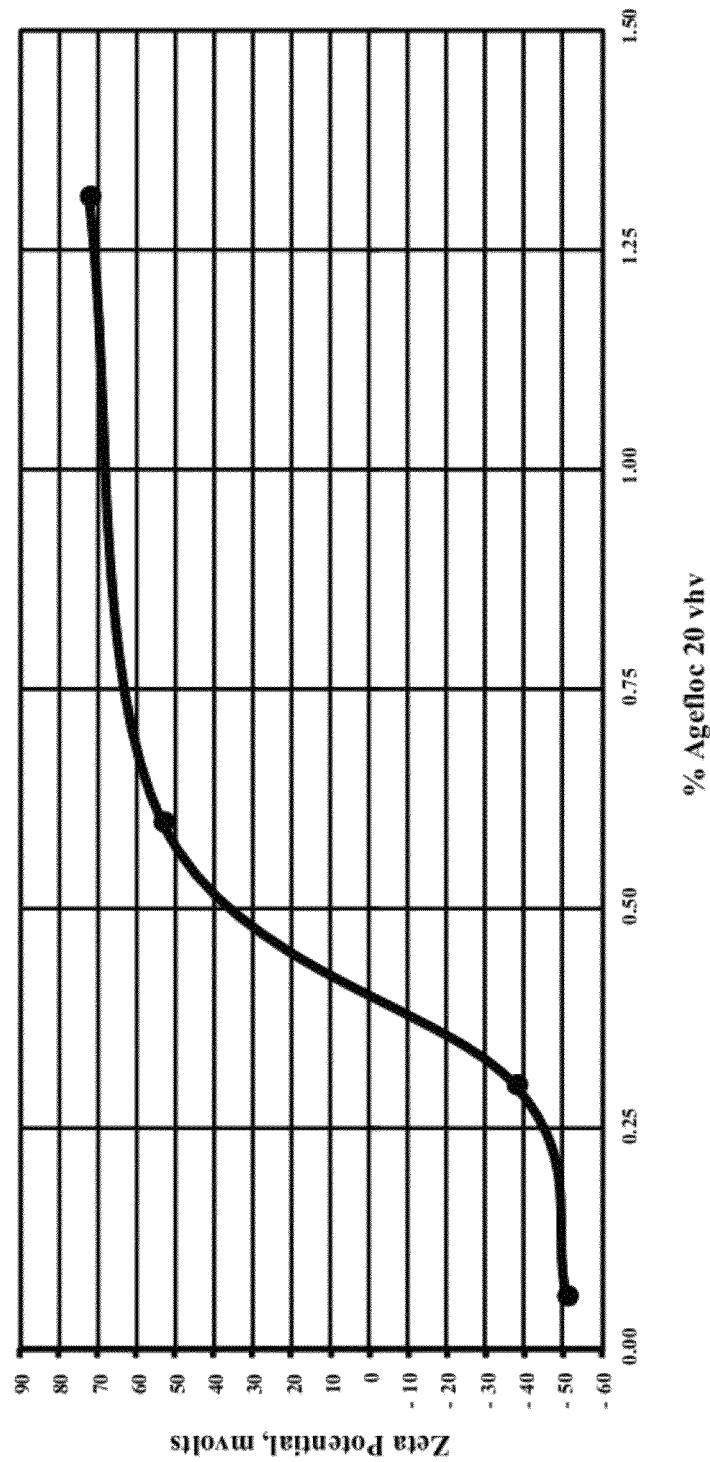
FIG. 1 plots the Zeta Potential of increasing concentrations of cationic polymer in aqueous solution with a constant amount of the anionic surfactant sodium lauryl sulfate.

The inventor has found that a new surfactant water gellant can be prepared having a desired higher viscosity by the addition of a small amount of a phosphorus-containing compound, than in the absence of a phosphorus-containing compound. The phosphorus-containing compound can be added to adjust the gellation rate, to increase the build up of viscosity, to increase the final viscosity of the gelled system and to modify gellant properties. The inventor has also found that the phosphorus-containing compound increases the viscosity of the gellant at low dosages up to as much as 3 times the amount of viscosity as measured in centipoise as compared to the gellant in the absence of the phosphorus-containing compound.

The compositions of this invention relates broadly to a gelling composition: (a) a cationic or anionic polymer, (b) a lesser amount of an oppositely charged surfactant, in a ratio to provide a Zeta Potential of 20 millivolts or higher, or −20 millivolts or lower, (c) a small amount of a hydrophobic alcohol having 6 to 23 carbon atoms and (d) an effective amount of a phosphorus-containing compound sufficient to improve gel viscosity, to improve gel, reduce a gel time, and improve gel stability. In certain embodiments, the composition also includes a small amount of a gel promoter comprising one or more of (e) an amphoteric surfactant and/or (f) an amine oxide surfactant, while maintaining the same limits of Zeta Potential. The present compositions are ideally well suited for well treatment, especially fracturing fluid treatments, and aqueous gellants.

The present invention also broadly relates to method for treating wells, fracturing formations, and fracturing and propping formations.

Suitable Reagents

The surfactant which is oppositely charged from the polymer is sometimes called herein the "counterionic surfactant." By this we mean a surfactant having a charge opposite that of the polymer.

Suitable cationic polymers include polyamines, quaternary derivatives of cellulose ethers, quaternary derivatives of guar, homopolymers and copolymers of at least 20 mole percent dimethyl diallyl ammonium chloride (DMDAAC), homopolymers and copolymers of methacrylamidopropyl trimethyl ammonium chloride (MAPTAC), homopolymers and copolymers of acrylamidopropyl trimethyl ammonium chloride (APTAC), homopolymers and copolymers of methacryloyloxyethyl trimethyl ammonium chloride (METAC), homopolymers and copolymers of acryloyloxyethyl trimethyl ammonium chloride (AETAC), homopolymers and copolymers of methacryloyloxyethyl trimethyl ammonium methyl sulfate (METAMS), and quaternary derivatives of starch.

Suitable anionic polymers include homopolymers and copolymers of acrylic acid (AA), homopolymers and copolymers of methacrylic acid (MAA), homopolymers and copolymers of 2acrylamido-2-methylpropane sulfonic acid (AMPSA), homopolymers and copolymers of N-methacrylamidopropyl N,N-dimethyl amino acetic acid, N-acrylamidopropyl N,N-dimethyl amino acetic acid, N-methacryloyloxyethyl N,N-dimethyl amino acetic acid, and N-acryloyloxyethyl N,N-dimethyl amino acetic acid.

Anionic surfactants suitable for use with the cationic polymers include alkyl, aryl or alkyl aryl sulfates, alkyl, aryl or alkyl aryl carboxylates or alkyl, aryl or alkyl aryl sulfonates. Preferably, the alkyl moieties have about 1 to about 18 carbons, the aryl moieties have about 6 to about 12 carbons, and the alkyl aryl moieties have about 7 to about 30 carbons. Exemplary groups would be propyl, butyl, hexyl, decyl, dodecyl, phenyl, benzyl and linear or branched alkyl benzene derivatives of the carboxylates, sulfates and sulfonates. Included are alkyl ether sulphates, alkaryl sulphonates, alkyl succinates, alkyl sulphosuccinates, N-alkoyl sarcosinates, alkyl phosphates, alkyl ether phosphates, alkyl ether carboxylates, alpha-olefin sulphonates and acyl methyl taurates, especially their sodium, magnesium ammonium and mono-, di- and triethanolamine salts. The alkyl and acyl groups generally contain from 8 to 18 carbon atoms and may be unsaturated. The alkyl ether sulphates, alkyl ether phosphates and alkyl ether carboxylates may contain from one to 10 ethylene oxide or propylene oxide units per molecule, and preferably contain 2 to 3 ethylene oxide units per molecule. Examples of suitable anionic surfactants include sodium lauryl sulphate, sodium lauryl ether sulphate, ammonium lauryl sulphosuccinate, ammonium lauryl sulphate, ammonium lauryl ether sulphate, sodium dodecylbenzene sulphonate, triethanolamine dodecylbenzene sulphonate, sodium cocoyl isethionate, sodium lauroyl isethionate, and sodium N-lauryl sarcosinate.

Cationic surfactants suitable for use with the anionic polymers include quaternary ammonium surfactants of the formula $X^-N^+R^1R^2R^3$ where $R^1$, $R^2$, and $R^3$, are independently selected from hydrogen, an aliphatic group of from about 1 to about 22 carbon atoms, or aromatic, aryl, an alkoxy, polyoxyalkylene, alkylamido, hydroxyalkyl, or alkylaryl group having from about 1 to about 22 carbon atoms; and X is an anion selected from halogen, acetate, phosphate, nitrate, sulfate, alkylsulfate radicals (e.g., methyl sulfate and ethyl sulfate), tosylate, lactate, citrate, and glycolate. The aliphatic groups may contain, in addition to carbon and hydrogen atoms, ether linkages, and other groups such as hydroxy or amino group substituents (e.g., the alkyl groups can contain polyethylene glycol and polypropylene glycol moieties). The longer chain aliphatic groups, e.g., those of about 12 carbons, or higher, can be saturated or unsaturated. More preferably, $R^1$ is an alkyl group having from about 12 to about 18 carbon atoms; $R^2$ is selected from H or an alkyl group having from about 1, to about 18, carbon atoms; $R^3$ and $R^4$ are independently selected from H or an alkyl group having from about 1 to about 3 carbon atoms; and X is as described above.

Suitable hydrophobic alcohols having 6-23 carbon atoms are linear or branched alkyl alcohols of the general formula $C_MH_{2M+2-N}(OH)_N$, where M is a number from 6-23, and N is 1 when M is 6-12, but where M is 13-23, N may be a number from 1 to 3. Our most preferred hydrophobic alcohol is lauryl alcohol, but any linear monohydroxy alcohol having 8-15 carbon atoms is also preferable to an alcohol with more or fewer carbon atoms.

By a gel promoter we mean a betaine, a sultaine or hydroxysultaine, or an amine oxide. Examples of betaines include the higher alkyl betaines such as coco dimethyl carboxymethyl betaine, lauryl dimethyl carboxymethyl betaine, lauryl dimethyl alphacarboxyethyl betaine, cetyl dimethyl carboxymethyl betaine, cetyl dimethyl betaine, lauryl bis-(2hydroxyethyl)carboxymethyl betaine, oleyl dimethyl gamma-carboxypropyl betaine, lauryl bis-(2-hydroxypropyl)alpha carboxyethyl betaine, coco dimethyl sulfopropyl betaine, lauryl dimethyl sulfoethyl betaine, lauryl bis-(2-hydroxyethyl) sulfopropyl betaine, amidobetaines and amidosulfobetaines (wherein the $RCONH(CH_2)_3$ radical is attached to the nitrogen atom of the betaine, oleyl betaine, and cocamidopropyl betaine. Examples of sultaines and hydroxysultaines include materials such as cocamidopropyl hydroxysultaine.

By a Zeta potential having an absolute value of at least 20 we mean a Zeta potential having a value of +20 of higher or −20 or lower.

Amphoteric surfactants suitable for use with either cationic polymers or anionic polymers include those surfactants broadly described as derivatives of aliphatic secondary and tertiary amines in which the aliphatic radical can be straight or branched chain and wherein one of the aliphatic substituents contains from about 8 to about 18 carbon atoms and one contains an anionic water solubilizing group such as carboxy, sulfonate, sulfate, phosphate, or phosphonate. Suitable amphoteric surfactants include derivatives of aliphatic secondary and tertiary amines in which the aliphatic radical can be straight or branched chain and wherein one of the aliphatic aliphatic substituents contains from about 8 to about 18 carbon atoms and one contains an anionic water solubilizing group, e.g., carboxy, sulfonate, sulfate, phosphate, or phosphonate. Examples of compounds falling within this definition are sodium 3-dodecylaminopropionate, and sodium 3-dodecylaminopropane sulfonate.

Suitable amine oxides include cocoamidopropyl dimethyl amine oxide and other compounds of the formula $R^1R^2R^3N\rightarrow O$ wherein $R^3$ is a hydrocarbyl or substituted hydrocarbyl having from about 8 to about 30 carbon atoms, and $R^1$ and $R^2$ are independently hydrogen, a hydrocarbyl or substituted hydrocarbyl having up to 30 carbon atoms. Preferably, $R^3$ is an aliphatic or substituted aliphatic hydrocarbyl having at least about 12 and up to about 24 carbon atoms. More preferably $R^3$ is an aliphatic group having at least about 12 carbon atoms and having up to about 22, and most preferably an aliphatic group having at least about 18 and no more than about 22 carbon atoms.

Suitable phosphorus-containing compounds suitable for use in the invention include, without limitation, phosphates or phosphate equivalents or mixtures or combinations thereof. Suitable phosphates include, without limitation, mono-alkali metal phosphates (PO(OH)(OM), where M is Li, Na, K, Rd, or Cs), di-alkali metal phosphates $(PO(OH)(OM)_2$, where each M is the same or different and is Li, Na, K, Rd, or Cs) such as dipotassium phosphate $(PO(OH)(OK)_2)$ and disodium phosphate, $(PO(OH)(ONa)_2)$, tri-alkali metal phosphates $(PO(OM)_3$, where each M is the same or different and is Li, Na, K, Rd, or Cs) such as trisodium phosphate $(PO(ONa)_3)$ and tripotassium phosphate $(PO(OK)_3)$, carbyl phosphates $(PO(OR^1)(OM)_2$, where $R^1$, is a carbyl group and M is H, Li, Na, K, Rd, and/or Cs), dicarbyl phosphates $(PO(OR^1)(OR^2)(OM)$, where $R^1$ and $R^2$ are the same or different carbyl groups and M is H, Li, Na, K, Rd, or Cs), tricarbyl phosphates $(PO(OR^1)(OR^2)(OR^3)$, where $R^1$, $R^2$, and $R^3$, are the same or different carbyl groups), or mixtures or combinations thereof.

Suitable carbyl group include, without limitations, carbyl group having between about 3 and 40 carbon atoms, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. The carbyl group can be an alkyl group, an alkenyl group, an aryl group, an alkaaryl group, an aryalkyl group, or mixtures or combinations thereof, i.e., each carbyl group in the phosphate can be the same or different. In certain embodiments, the carbyl group has between about 3 and about 20, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In certain embodiments, the carbyl group has between about 3 and about 16, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In certain embodiments, the carbyl group has between about 3 and about 12, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In certain embodiments, the carbyl group has between about 4 and about 8, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group.

Suitable tri-alkyl phosphates include, without limitations, alkyl group having from about 3 to about 20 carbon atoms, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In certain embodiments, the tri-alkyl phosphate includes alkyl groups having from about 4 to about 12 carbon atoms, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In other embodiments, the tri-alkyl phosphate includes alkyl groups having from about 4 to about 8 carbon atoms, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. Such phosphates can be produced by reacting a phosphate donor such as phosphorus pentoxide and a mixture of alcohols in desired proportions.

Features of the Compositions

Although we prefer to use polymers of diallyl dimethyl ammonium chloride and particularly its homopolymers where cationic polymers are used in our invention, we may use any water soluble cationic polymer effective to viscosify water. Preferably the polymers will have a molecular weight of at least 10,000. Such polymers include homopolymers and copolymers made with cationic monomers (that is, at least 20% of the mer units contain cationic functional groups, while the balance may be nonfunctional or nonionic) such as diallyldimethylammonium chloride, methacrylamidopropyltrimethyl ammonium chloride, acryloyloloxyethyltrimethylammonium chloride, diallyl diethylammonium chloride, methacryloyoloxyethyltrimethyl ammonium chloride, vinyl pyridine, and vinyl benzyltrimethyl ammonium chloride.

The preferred anionic surfactant to be used with the cationic polymer is sodium lauryl sulfate, but any alkali metal alkyl sulfate or sulfonate having 8-22 carbon atoms may be used, and alkyl ether sulfates and sulfonates having 8-22 carbon atoms are included within our term "counterionic surfactant". Commercial forms of sodium lauryl sulfate including minor or even significant amounts of other similar surfactants maybe used. Other common anionic surfactants may also be useful.

The alkyl alcohol is preferably a linear alkyl one having from 8 to 22 carbon atoms or, more preferably, 8-15 carbon atoms. Commercial forms of lauryl alcohol having other alcohols as a minor ingredient are satisfactory. We have found that some commercial forms of sodium lauryl sulfate contain lauryl alcohol in amounts sufficient to satisfy the lauryl alcohol requirements of our invention, and accordingly such sodium lauryl sulfates may sometimes be used as the anionic surfactant of our invention together with a cationic polymer, but without additional moieties of lauryl alcohol or other hydrophobic alcohol as described herein. We may substitute sodium lauryl ether sulfate for the sodium lauryl sulfate; lauryl alcohol should be added separately where this substitution is made.

When used, the amine oxide promoter is preferably lauryl amine oxide, but we may use any amine oxide of the formula $R^1R^2R^3NO$, preferably $R^1N(CH_3)_2O$, where $R^1$ is an alkyl group of 8-22 carbon atoms, and $R^1$ and $R^2$ are independently alkyl groups having from 1 to 4 carbon atoms. We may use any amine oxide of the formula $R^1R^2R^3N \rightarrow O$ as defined by Dahayanake et al in U.S. Pat. No. 6,258,859, which is hereby incorporated by reference in its entirety. See also Tillotson U.S. Pat. No. 3,303,896 and Thompson U.S. Pat. No. 4,108,782, which are also incorporated by reference in their entirety for their descriptions of amine oxides. Generally, up to 1% by weight may be used, but as will be seen in FIG. 8, concentrations in the range of 0.1% to 0.4% may be quite sufficient for gel promotion.

When used, the amphoteric surfactant is preferably a betaine such as cocamidopropyl betaine, but we may use other types of amphoteric surfactants, including aminopropionate and sultaines. We may use any of the surfactant betaines listed or described by Sake et al in U.S. Pat. No. 6,284,230, which is hereby incorporated by reference in its entirety.

The weight ratio of cationic polymer to alkyl sulfate is generally 10:1 to 1.1:1, but the ratio may also be based on the molar ratio of cationic moieties on the polymer and the anionic sites on the surfactant.

Where an anionic polymer is used, we prefer to use a homopolymer of "AMPSA"—acrylamidomethylpropyl sulfonic acid—together with a common quaternery surfactant generally in the same ratios as recited above for cationic polymers and anionic surfactants, provided the absolute value of the Zeta Potential is at least 20. This may be done with or without gel promoters, but where there are no gel promoters, the concentration of anionic polymer will be significantly higher than where a gel promoter is used.

EXPERIMENTS OF THE INVENTION

In FIG. 1, the Zeta potential of combinations of increasing percentages of cationic polymer with 0.5% sodium lauryl sulfate is presented. As is known in the art, where the Zeta potential is 0, there is no stability to the suspension and the materials in question will drop out of an aqueous carrier. As seen in FIG. 1, high and low ratios of cationic polymer to anionic surfactant have significant Zeta Potential readings, while the intermediate weight ratios of these particular materials have lower Zeta Potential readings. In FIG. 1, the cationic polymer "Agefloc 20 vhv" is a homopolymer of dimethyl diallyl ammonium chloride having an average molecular weight of 250,000; a 20% solution of poly diallyl dimethyl ammonium chloride homopolymer ("pDADMAC") was used. A coacervate is formed where the Zeta potential is either higher than +20 millivolts or "lower" than −20 millivolts, i.e. has an absolute value of at least 20. As used herein, the term absolute value means a positive or a negative number; thus a "Zeta Potential having an absolute value of at least 20 millivolts" includes either a positive or a negative value of the measurement in millivolts. While FIG. 1 shows the weight percents of the ingredients, the relative charge densities of the polymer and the necessary amount of oppositely charged surfactant are important in determining the Zeta Potential.

Figure 2:
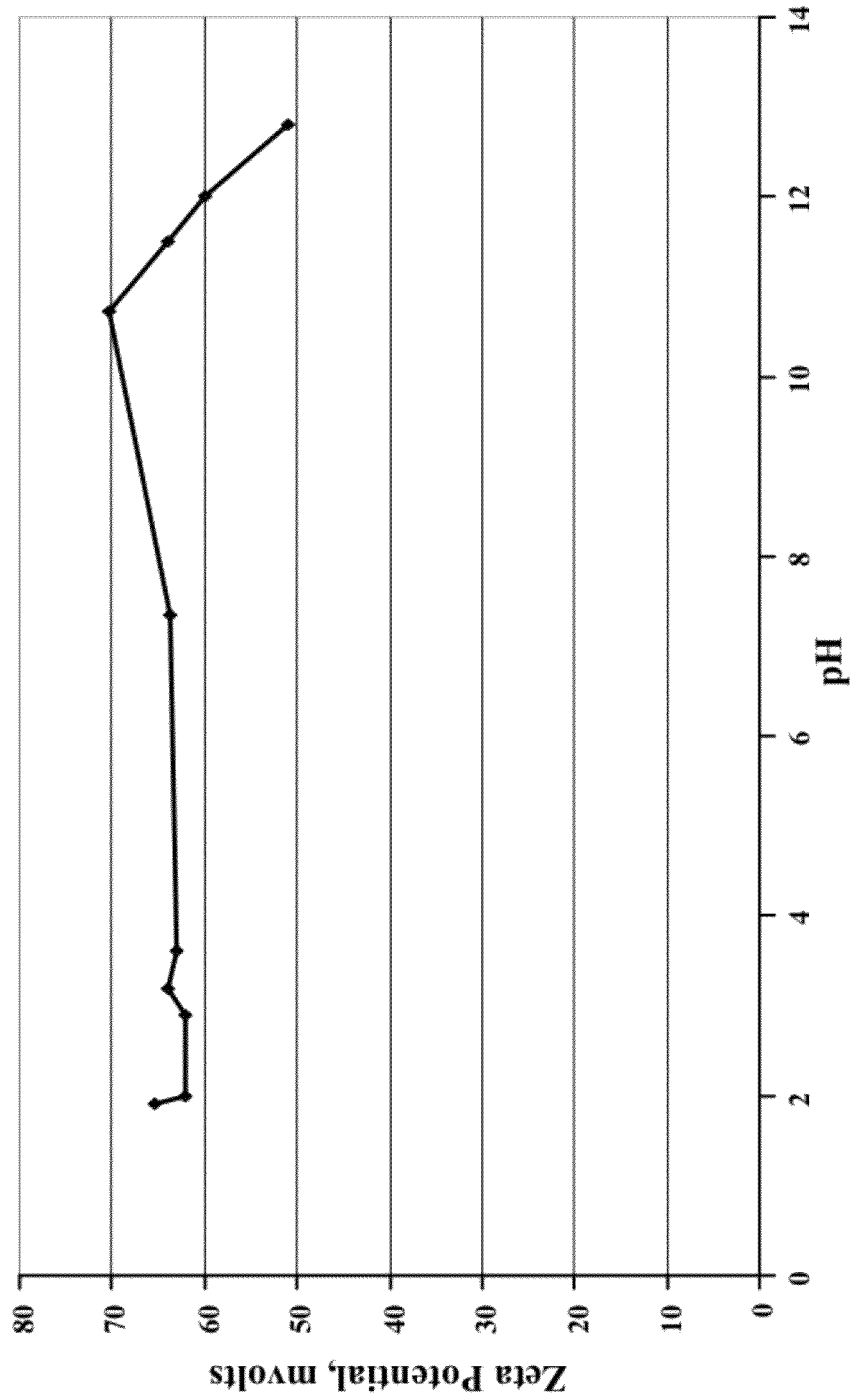
FIG. 2 shows the effect of pH on Zeta Potential of a combination of cationic polymer and sodium lauryl sulfate at a particular ratio, a basic composition of our invention.

FIG. 2 employs a composition, called "Zeta Gel" in this and other figures herein, comprising 1.3% Agefloc20 vhv pDADMAC and 0.5% sodium lauryl sulfate, which provided the data point in FIG. 1 at about 68 millivolts. FIG. 2 shows that the Zeta Potential of this composition of our invention is not significantly affected through a wide range of pH. For generating the data of FIG. 2, potassium hydroxide was used to increase the pH and formic acid was used to decrease it. The term "½ Zeta Gel" means the Zeta Gel solution was diluted by 50%, providing a solution actually used of 1.3% cationic polymer and 0.5% anionic surfactant.

Figure 3:
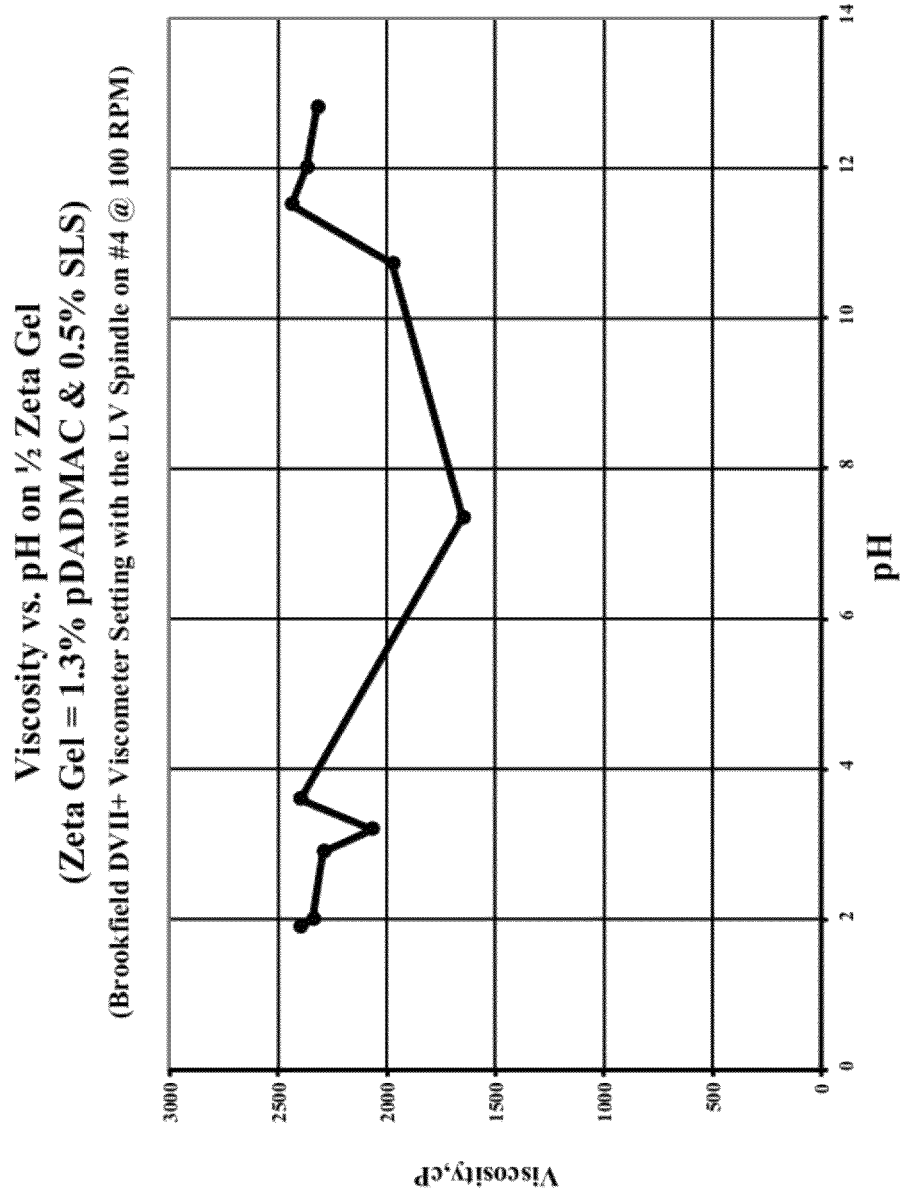
In FIG. 3, the effect of a wide variance of pH on viscosity is shown as applied to the same basic composition of FIG. 3.

In FIG. 3, the pH was varied in a composition similar to that of FIG. 2 to determine the effect of pH on viscosity of the composition. While the viscosity is somewhat lower at pH 7 than for higher and lower pH's, it is otherwise not significantly affected by pH.

Figure 4:
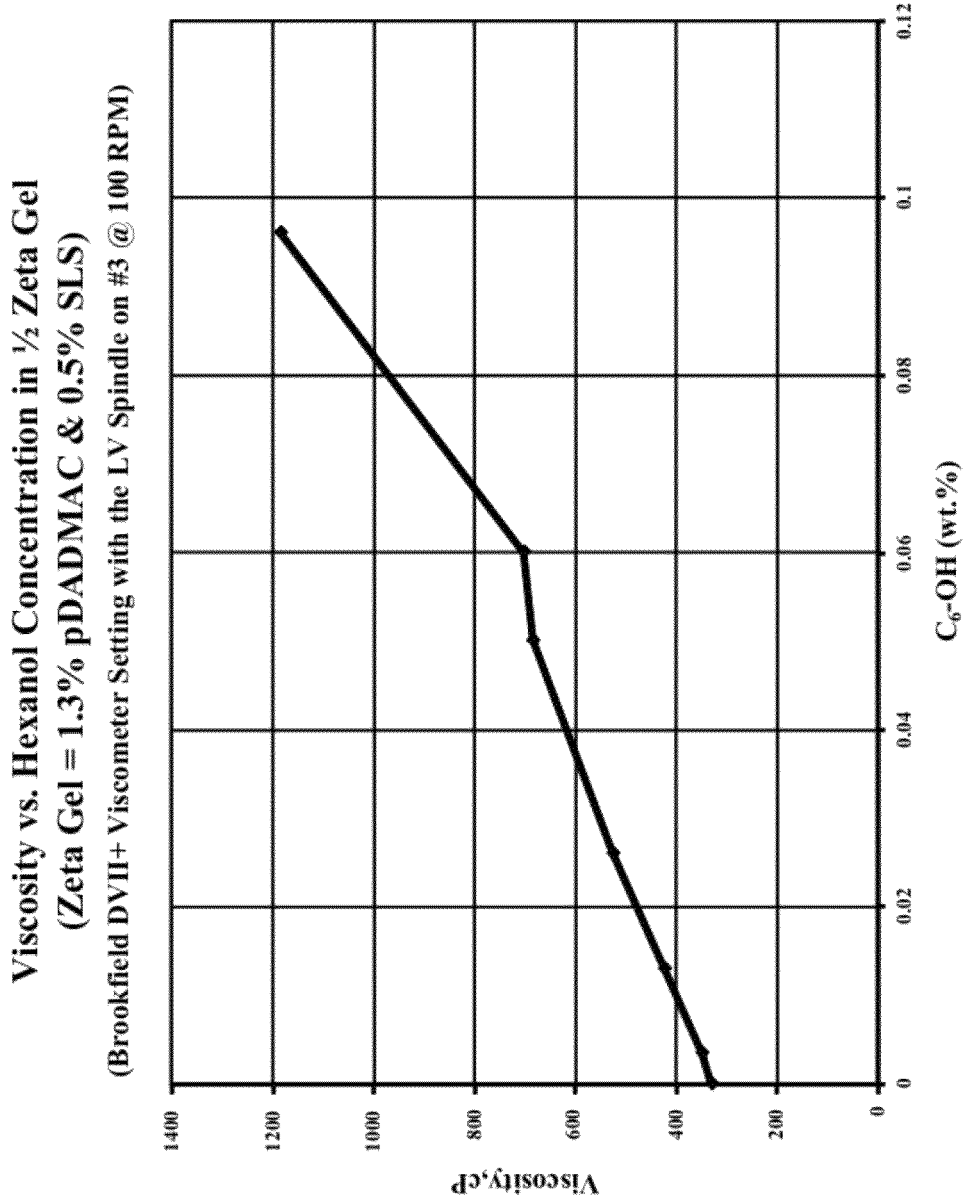
FIG. 4 demonstrates the viscosity effects of small amounts of hexanol on a base composition of our invention.
Figure 5:
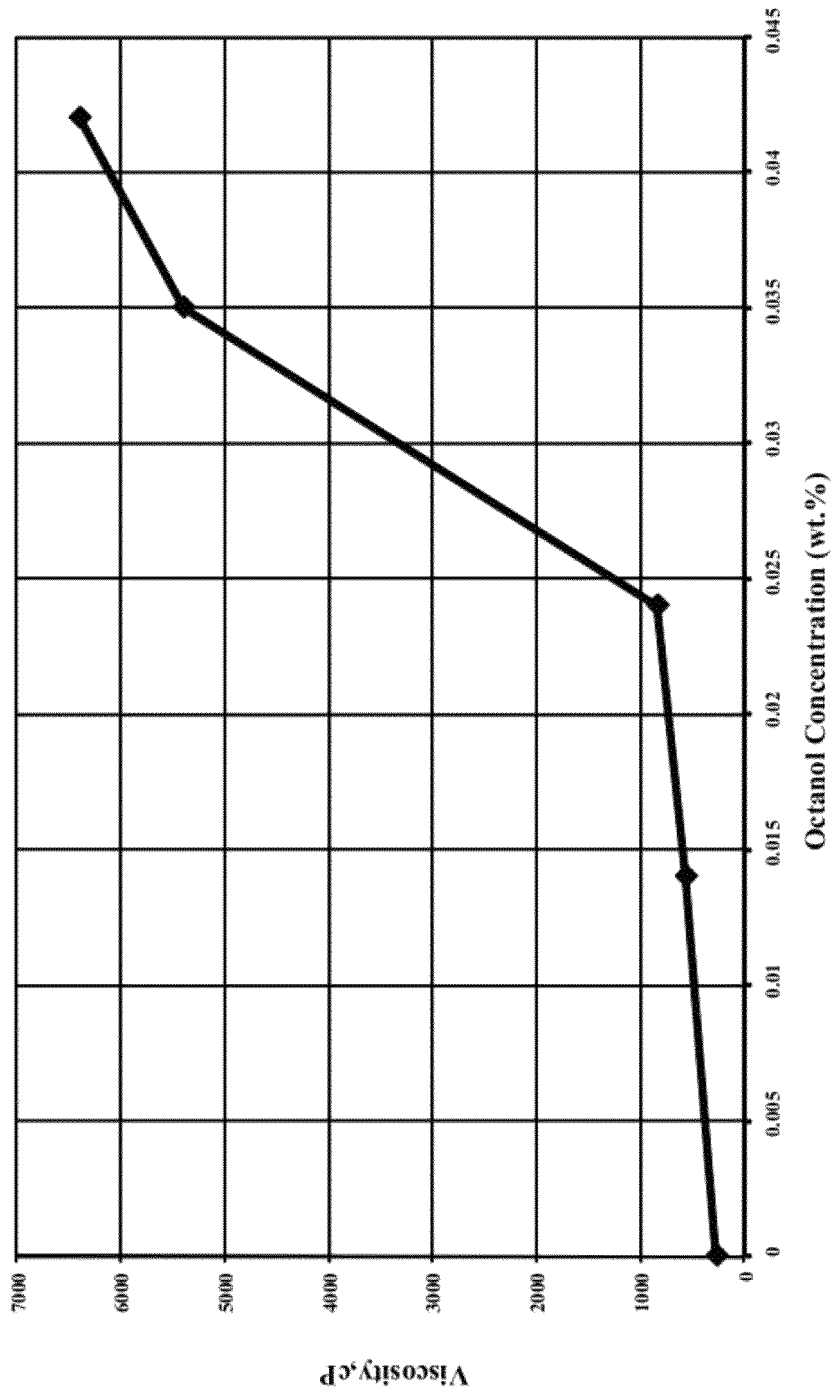
FIG. 5 plots viscosity effects the inclusion of small amounts of octanol in a base composition of our invention.

FIGS. 4 and 5 are charts showing the viscosity of the composition used in FIGS. 2 and 3 when hexanol and octanol are used for the hydrophobic alcohol, respectively. For these pDADMAC and sodium lauryl sulfate concentrations and/or for this ratio of the ingredients, it is seen that the viscosities generally increase with increasing concentrations of the alcohol used.

Figure 6:
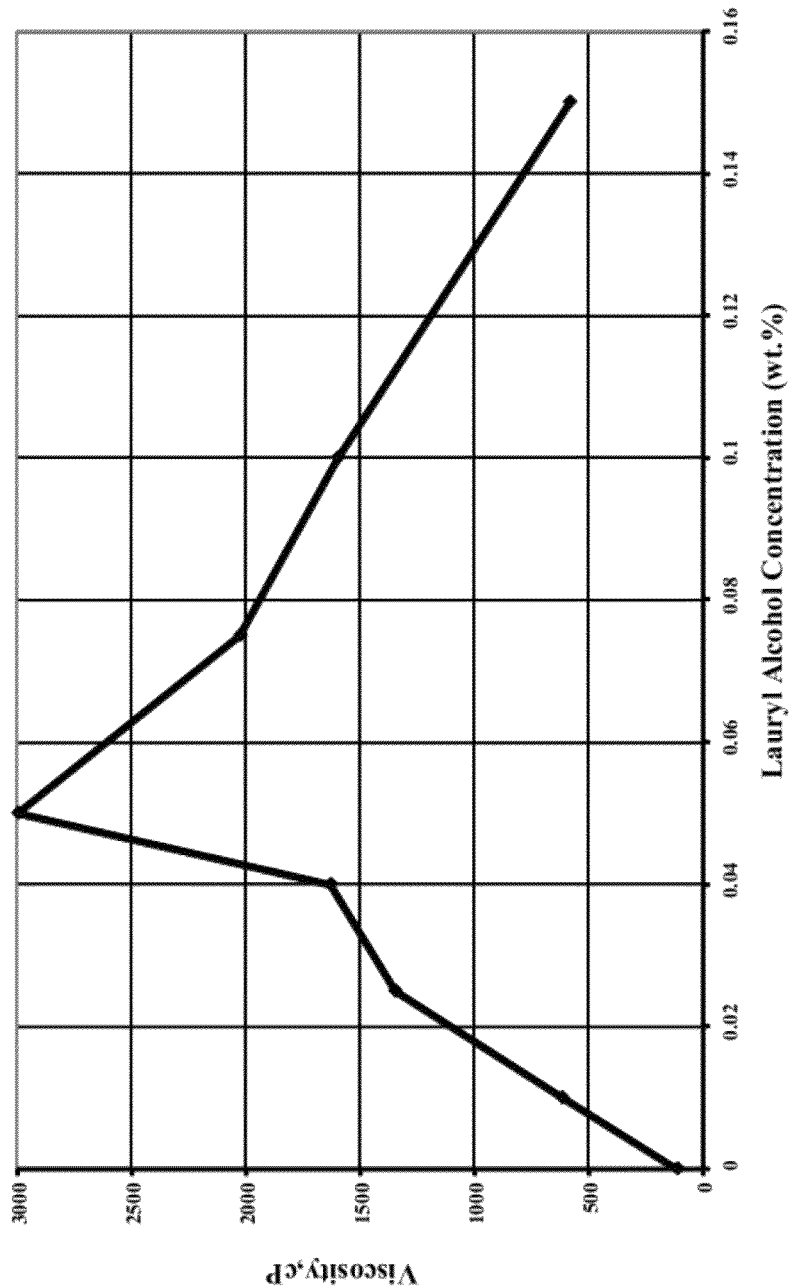
FIG. 6 plots viscosity effects the inclusion of small amounts of lauryl alcohol in a base composition of our invention.

In FIG. 6, where lauryl alcohol is substituted for the hexanol and octanol of FIGS. 4 and 5, it is seen that the viscosity increases rapidly with increasing concentration of lauryl alcohol until about 0.05 percent; then decreases with increasing concentration. Persons skilled in the art may realize that this may provide a tool for manipulating the viscosity as required for various purposes.

Figure 7:
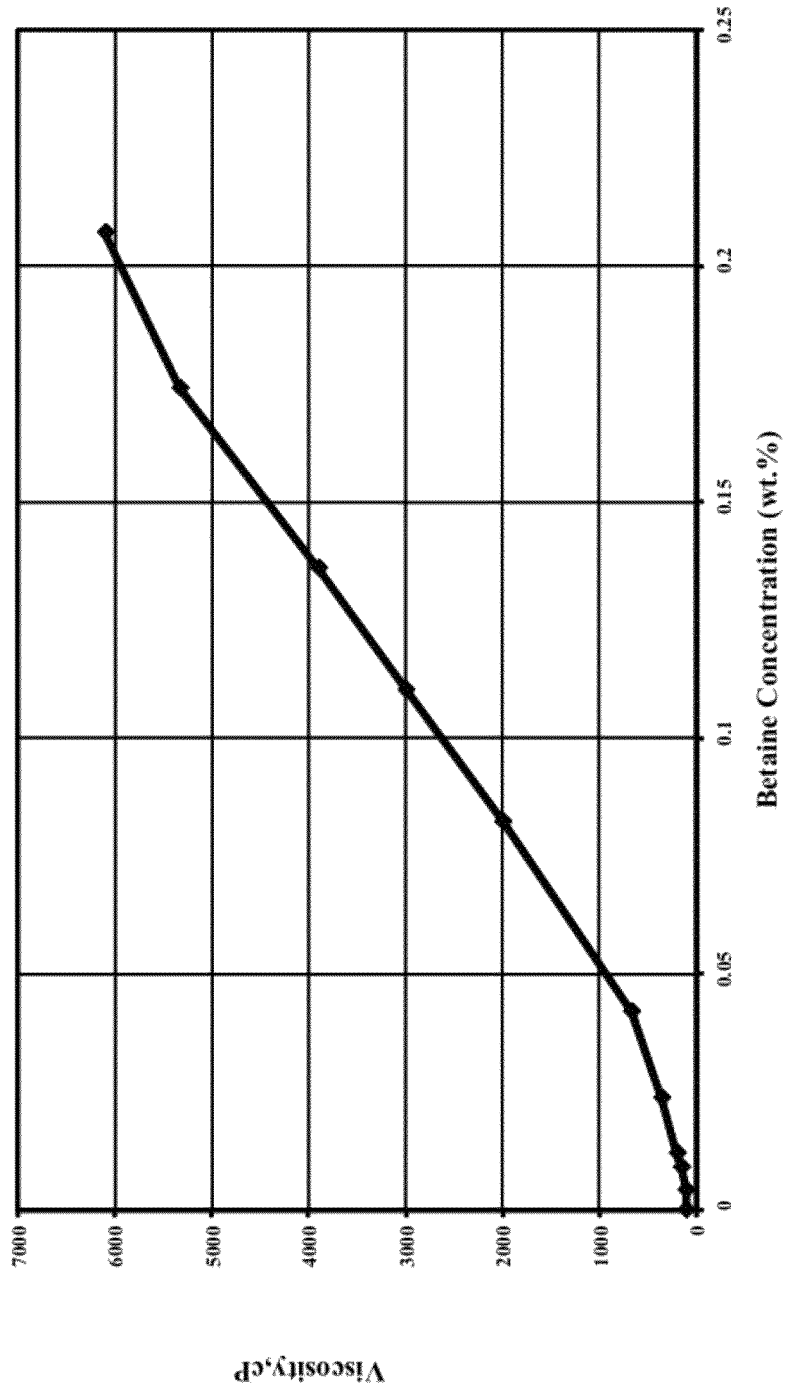
FIG. 7 shows the viscosity of our composition as a function of increasing concentrations of added betaine.

FIG. 7 is a chart demonstrating that increasing concentration of betaine in the same basic composition of the previous figures will result in increasing viscosities. Similar curves (not shown) were obtained substituting the betaines "Mirataine CAB-A" (cocamidopropyl betaine), "Mirataine BB" (lauramidopropyl betaine), and "Mirataine CBS" (cocamidopropyl hydroxy sultaine) for the betaine of FIG. 7.

Figure 8:
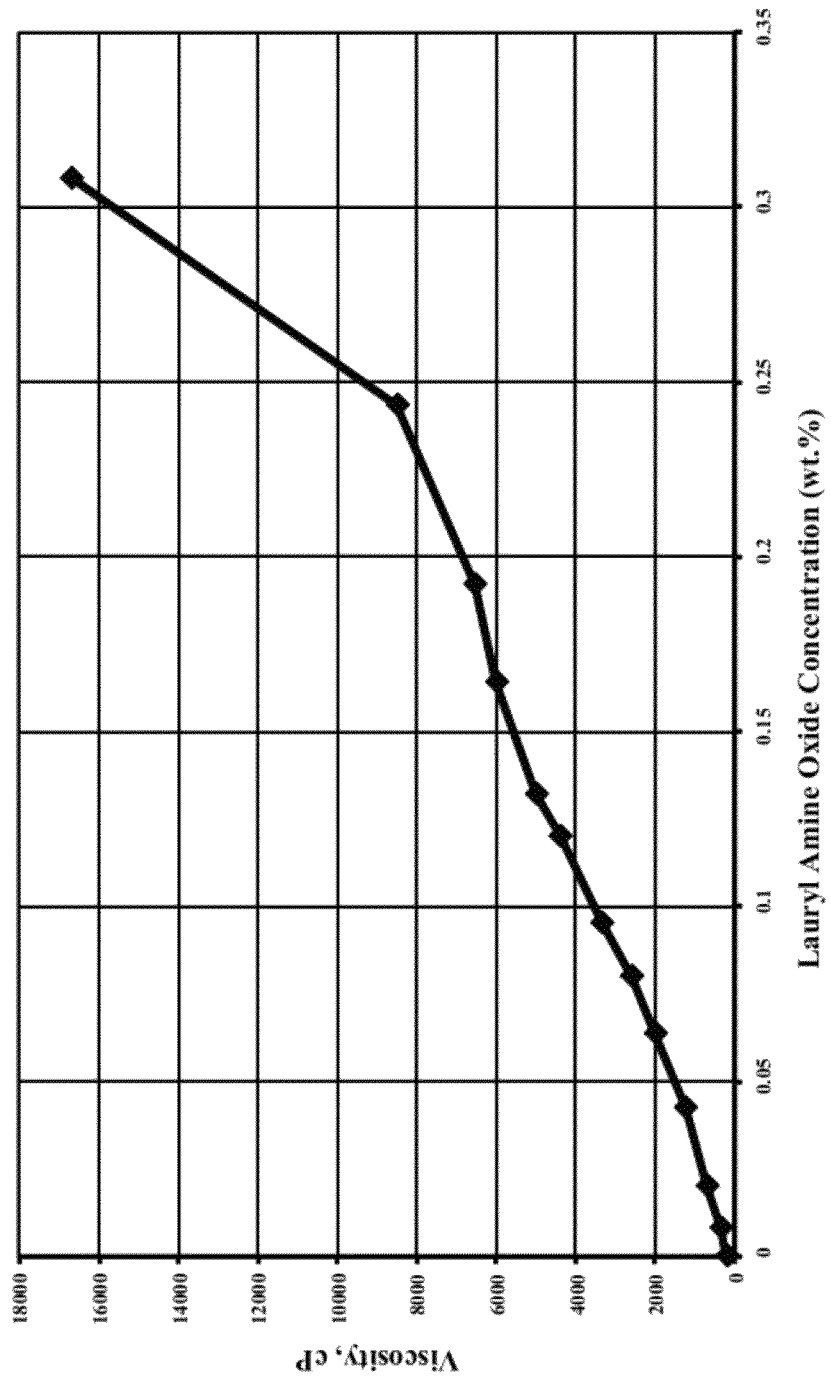
In FIG. 8, an amine oxide was added to the base composition at various low concentrations to determine the effect on viscosity.

Likewise, as shown in FIG. 8, increasing concentrations of amine oxide will increase the viscosity of the base composition of cationic polymer and a selected smaller percentage of anionic surfactant.

Table 1 below shows the effect on viscosity of certain of our compositions with components in addition to polymer and surfactant.

TABLE 1

| SLS$_1$ | pDADMAC$^2$ | Am Ox$^3$ | Betaine$^4$ | Alcohol$^5$ | Viscosity |
|---|---|---|---|---|---|
| 0.50% | 6.5%/1.3% | 0 | 0 | 0 | 200 cP |
| 0.25% | 3.25%/0.65% | 0 | 0 | 0 | 20 cP |
| 0.25% | 3.25%/0.65% | 0 | 0.35% | 0 | 900 cP |
| 0.25% | 3.25%/0.65% | 0 | 0.35% | 0.025% | 3350 cP |
| 0.25% | 3.25%/0.65% | 0.30% | 0.35% | 0.025% | 5500 cP |

In Table 2, a different source of sodium lauryl sulfate is used for comparison, using all the other ingredients in the same concentrations as Table 1.

TABLE 2

| SLS$^1$ | pDADMAC$^2$ | Am Ox$^3$ | Betaine$^4$ | Alcohol$^5$ | Viscosity |
|---|---|---|---|---|---|
| 0.50% | 6.5%/1.3% | 0 | 0 | 0 | 5700 cP |
| 0.25% | 3.25%/0.65% | 0 | 0 | 0 | 60 cP |
| 0.25% | 3.25%/0.65% | 0 | 0.35% | 0 | 3850 cP |
| 0.25% | 3.25%/0.65% | 0 | 0.35% | 0.025% | 5000 cP |
| 0.25% | 3.25%/0.65% | 0.30% | 0.35% | 0.025% | 6150 cP |

Following is a Key to the Superscripts in Tables 1 and 2:
1. SLS=sodium lauryl sulfate. In Table 1, the SLS was 70% from Aldrich; in Table 2, it was Acmepon 95%. Values in the tables are in terms of pure SLS.
2. pDADMAC is poly(diallyldimethyl ammonium chloride)homopolymer having a average molecular weight of 250,000 in Table 1 and at least 400,000 in Table 2. In each case, it was used as a 20% solution; hence the percentage on the left in each cell of the tables is the amount of solution and the percentage on the right is the amount of neat pDADMAC.
3. Am Ox is a 40% solution of lauryl amine oxide, SHER-REX 1770.
4. The betaine used in all cases was cocamidyopropyl betaine.
5. The alcohol was dodecanol, i.e. lauryl alcohol.
6. Viscosity is reported as centipoises as measured on RTV Brookfield viscometer at 20 rpm using spindle #4 and at ambient temperature.

A comparison of the initial use of the sodium lauryl sulfate, at 0.5% in each case, shows a much higher viscosity achieved by the Acmepon product. We surmise that this is attributable to a higher percentage of lauryl alcohol impurity in the Acmepon product. Persons skilled in the art will perceive that the rest of the data are consistent with this assumption. The compositions including separately added lauryl alcohol yielded significantly higher viscosities than the remainder of those without such a separate addition.

Figure 9:
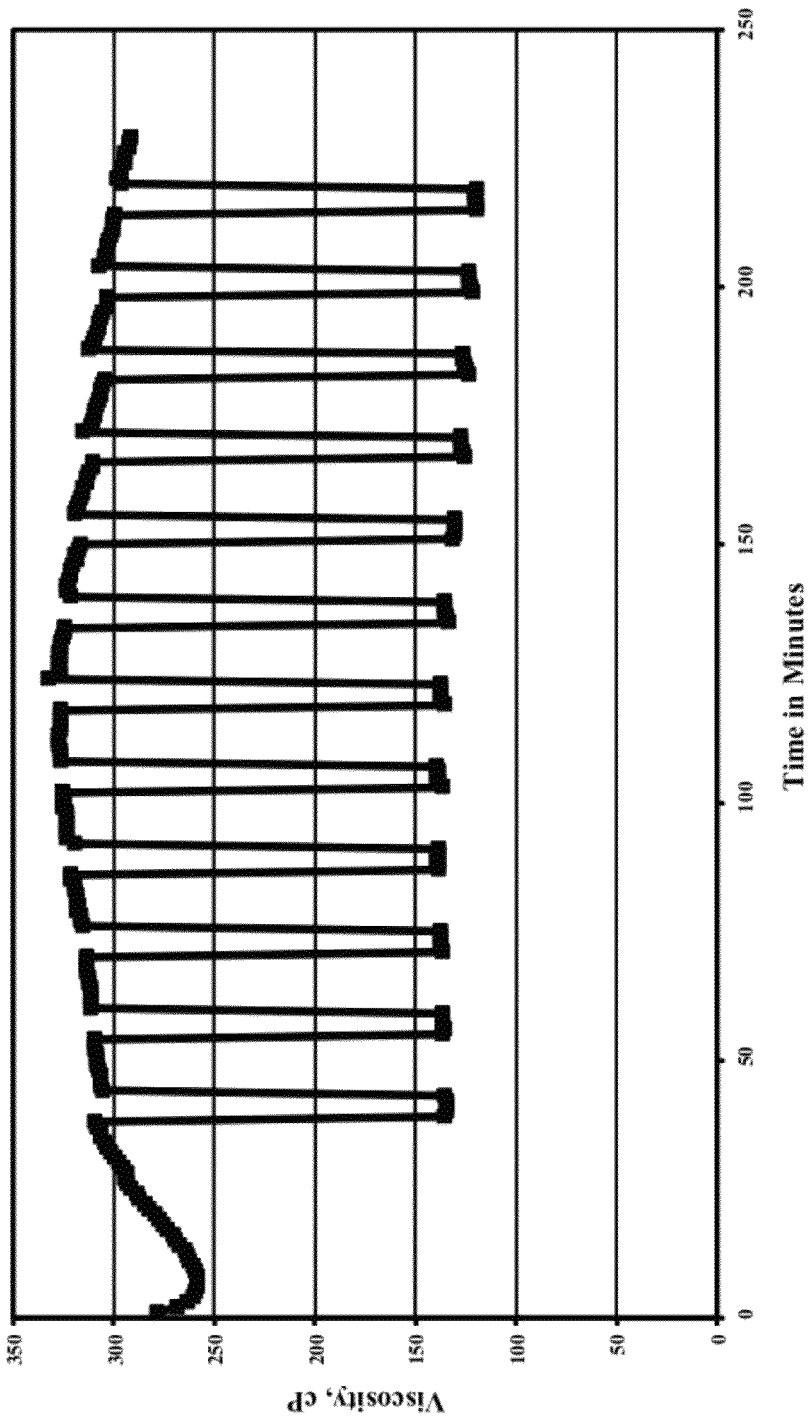
FIGS. 9 and 10 show the thixotropicity and shear stability of a variation of our composition including three additives: a betaine, an amine oxide, and an alkyl alcohol.

In FIG. 9, the thermal and shear stability of a multiple ingredient gel of our invention is shown in terms of Fann viscosity. For this data collection, a gel of half the concentration of polymer and surfactant [called "¼ Zeta Gel" on FIG. 9] was used, compared to the charts of FIGS. 1-8. That is, the pDADMAC was 0.65% by weight (having a molecular weight of 400,000 to 500,000) and the sodium lauryl sulfate was at 0.25%. A 40% solution of amine oxide was used providing a 0.12% concentration, and the betaine was 30% active; the betaine was therefore 0.105% by weight, and the lauryl alcohol was at 0.025%. The "3 additives" are thus the amine oxide, the betaine, and the lauryl alcohol. The Brookfield viscometer was alternately run at 100 rpm (top data series) and 300 rpm (lower data series). As can be seen from the chart, only negligible shear deterioration is evidenced at 160° F. over a period of continuous alternate high and low shear. It is clear that our invention permits the use of quite low concentrations of polymer to achieve excellent viscosities and viscosity stabilities.

Figure 10:
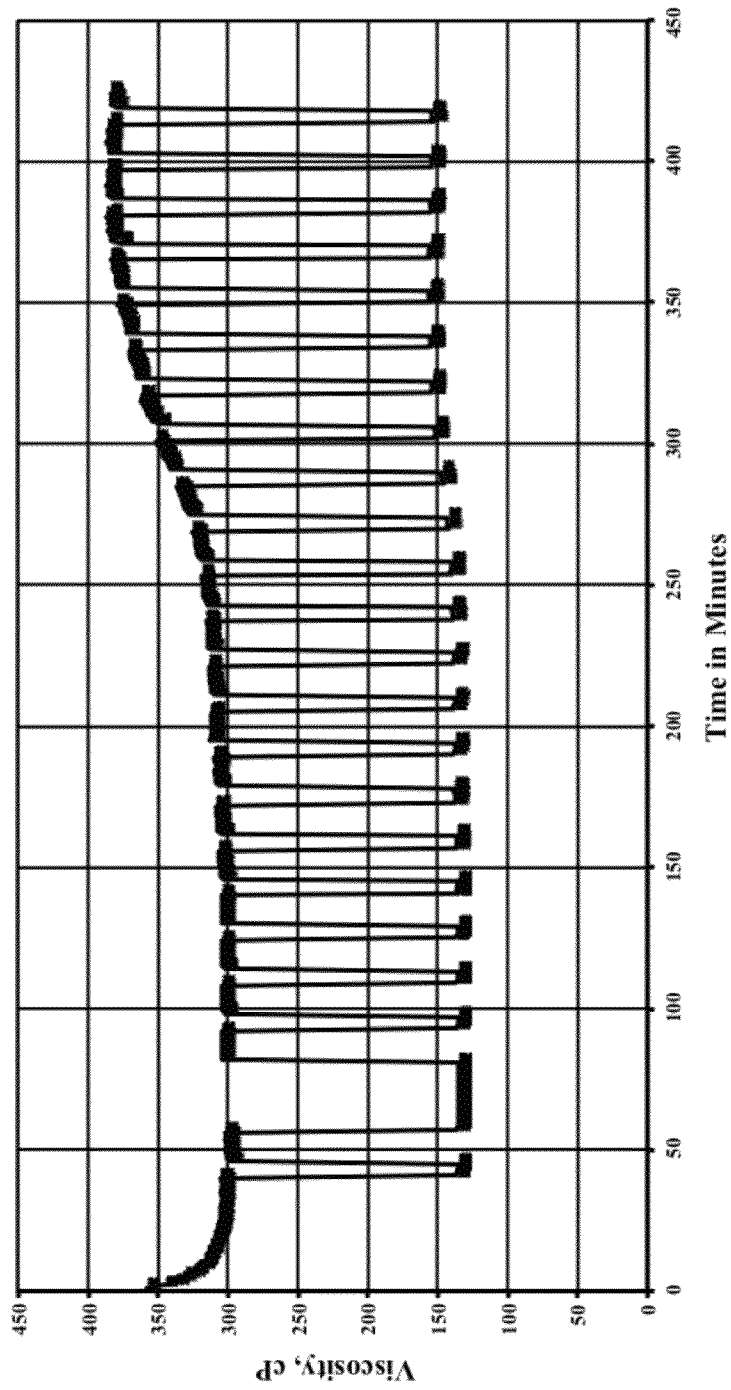

FIG. 10 shows similar alternating shear runs on the same composition as FIG. 9 using a Fann 50 viscometer, this time at 120° F. The thixotropic nature of the coacervate gel is demonstrated again.

Figure 11:
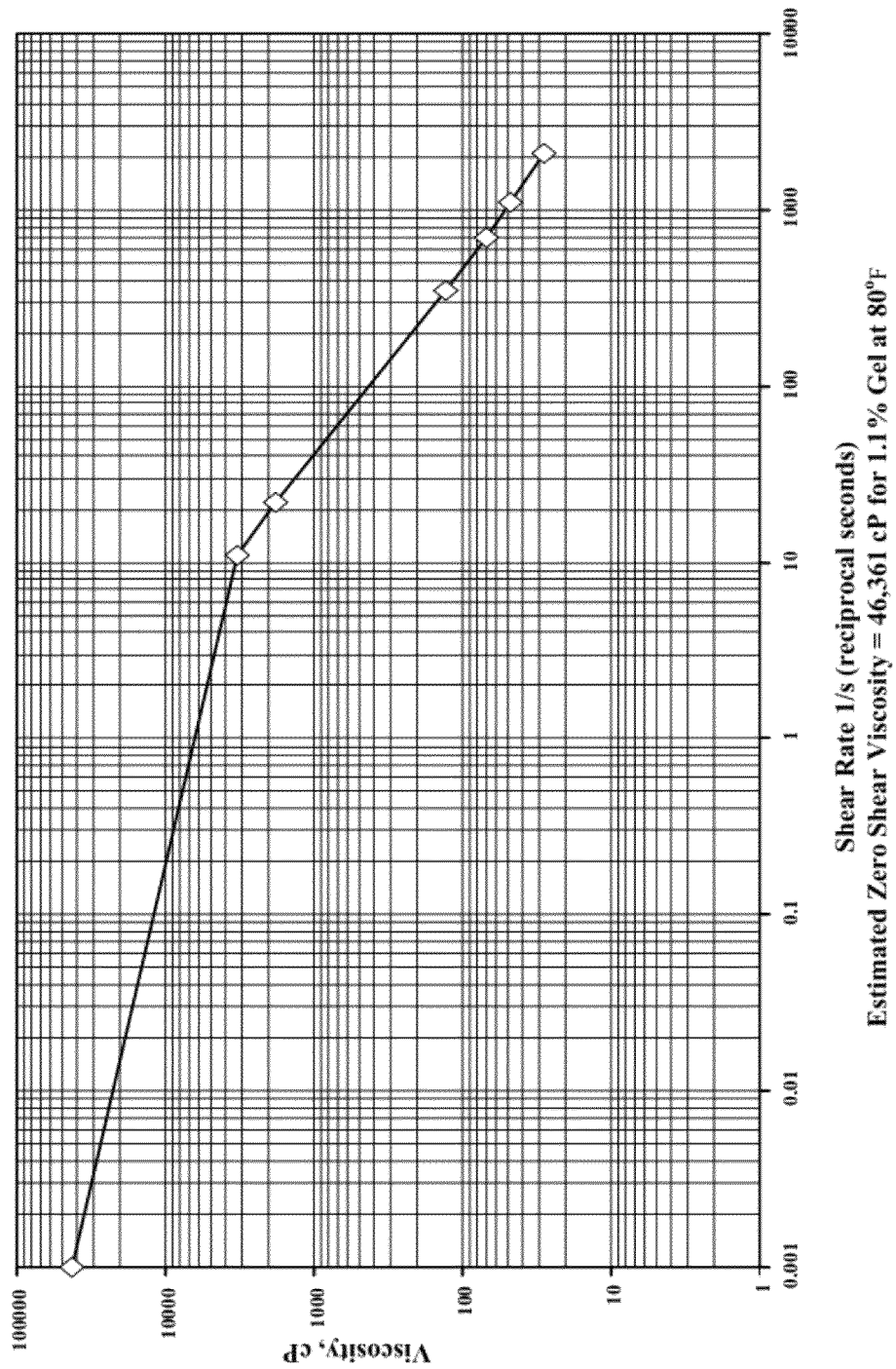
FIG. 11 is a chart showing viscosity in a 1.1% solution of a composition of the invention, notably the "zero shear" viscosity.

In FIG. 11, shear rate in reciprocal seconds is plotted against viscosity in centipoise, leading to an extrapolated "zero shear viscosity" of 46,361 cp, an excellent viscosity reading series for a well fracturing fluid. See SPE 73755, "Zero Shear Viscosity Determination of Fracturing Fluids: As Essential Parameter in Proppant Transport Characterizations" by Mahmoud Asadi, SPE, Michael W. Conway, SPE Stim Lab Inc., and Robert D. Barree, SPE, Barree and Associates. FIG. 11 is a nonlinear regression model following the procedure described by Asadi, Conway and Barree particularly with respect to FIGS. 5, 6, and 7 of that paper. As is known in the well fracturing art, in which a subterranean formation is fractured to facilitate the removal of hydrocarbons, it is necessary for the fluid first to transport the proppant to the fractures and then to suspend it for a useful period of time. The gelled fluid carrying the proppant is subject to wide ranges of shear depending, for example, on proximity to the fracture wall. Then, at rest, as the fractures are typically vertical, a dense, solid, propping agent has a tendency to sink in the fracturing fluid before it can be put to use, unless the fracturing fluid is able to suspend it. Accordingly, a projection of viscosity under zero shear, i.e. in which the fluid is substantially quiescent, provides highly significant information for the technician. In this case, the zero shear results are excellent, while results at other shear rates and temperatures are also excellent for pumpability and proppant transport. Our invention includes an aqueous gel comprising no more than 1% water soluble polymer having a zero shear viscosity of at least 45,000 following the zero shear viscosity extrapolation procedure of Asadi, Conway and Barree in SPE 73755.

The zero shear viscosity extrapolation of FIG. 11 is reinforced by the results shown in the following tabulations, a rough settling rate test performed on our gel at 1.1% by weight active (the same gel as used for FIGS. 9, 10 and 11), containing 0.65% polymer). A 100, ml graduated cylinder is filled with a test gel made by mixing 10 ml (weighing 16 g) of "20/40" proppant, a common commercial proppant of ceramic spheres, homogeneously dispersed in 100 ml of gel and maintained at 80° F. Settling of the proppant in the cylinder was then observed at the intervals shown, recording the depth of the substantially clear gel from the top of the cylinder.

| | Minutes | | | | | | | | | |
|---|---|---|---|---|---|---|---|---|---|---|
| | 0 | 10 | 30 | 45 | 60 | 75 | 90 | 110 | 139 | 150 | 180 |
| mm from top | 0 | 0 | 3.5 | 5 | 7 | 8 | 9.5 | 11 | 14.5 | 16 | 18 |

The result after 60 minutes, 7 millimeters of substantially clear gel, compares quite favorably with the settling rate, for example, of a Diesel gel which exhibited 16, ml of settling after 60 minutes. We refer to the above described settling rate test as a "10/100 20/40" settling rate test, meaning that a 20/40 proppant is used in a volume ratio of proppant to gel of 10/100 in a gel comprising 0.65% polymer. The depth of the upper layer of clear gel after 1 hour of settling provides a good rough comparison. Thus, our invention includes an aqueous gel comprising no more than 1% by weight water soluble polymer, preferably no more than 0.7% by weight polymer, characterized by a "10/100 20/40" settling rate result at 60 minutes no more than 8 millimeters, preferably no more than 7 millimeters.

Figure 12:
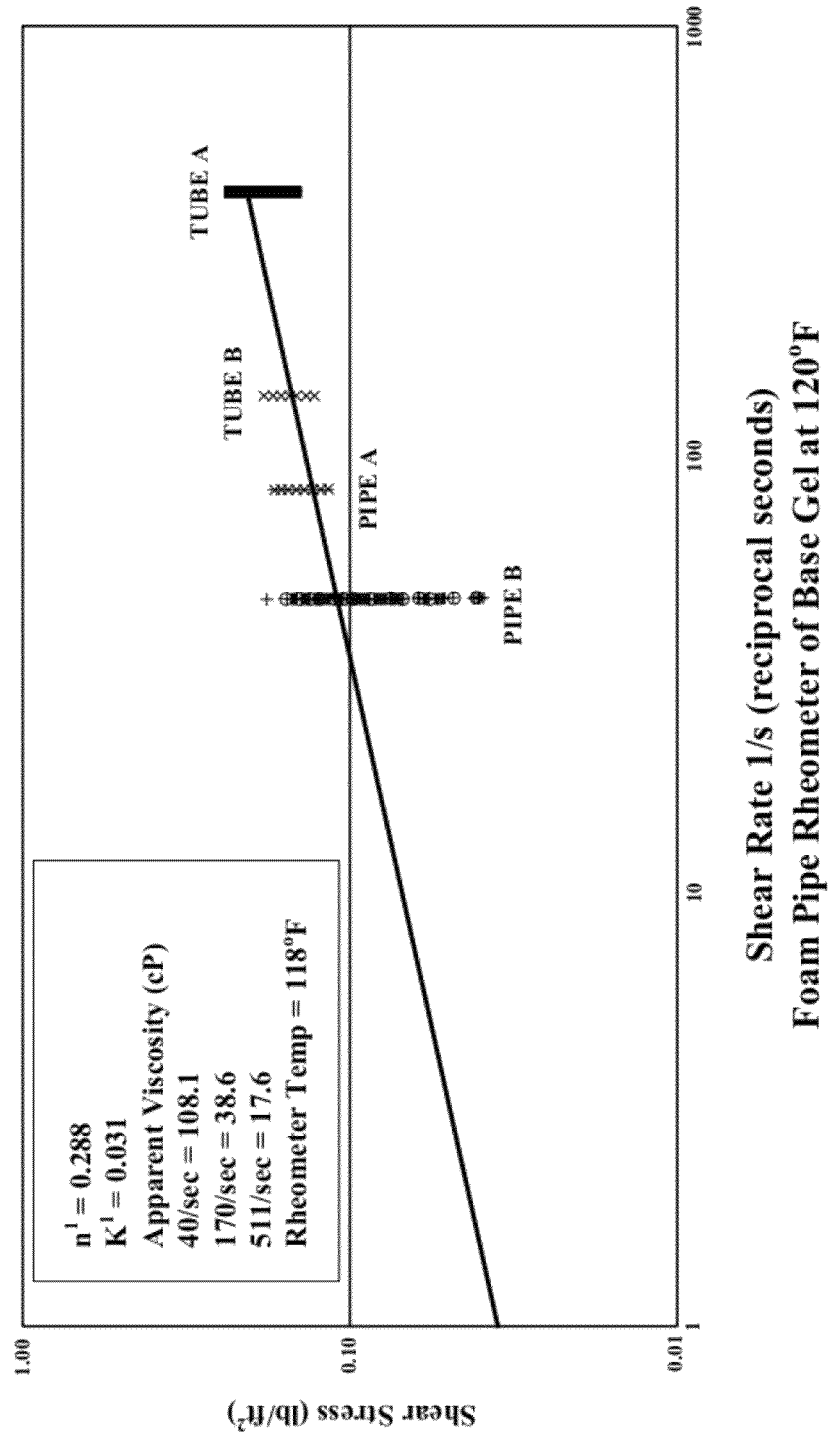
FIG. 12 shows foam pipe rheometer results in test pipes (shear stress plotted against shear rate) of a basic gel of our invention at a constant test temperature.

In FIG. 12, test results are shown for a rheometric test performed on our base gel (1.3% polymer). Prior to testing, the base gel had Fann 35 viscosity readings, at 75° F. and a pH of 3.05, as follows:

| RPM | Reading |
|---|---|
| 3 | 6 |
| 6 | 8 |
| 100 | 20 |
| 200 | 25 |
| 300 | 30 |
| 600 | 40 |

Standard foam generating surfactants were used to simulate a foam system and nitrogen was used as the gas. The mixture was pumped through sand to generate a standard foam texture and, at 1200 ml/min, routed to each of four conduits designated Tube A, Tube B, Pipe A, and Pipe B. Tube A has an internal diameter of 0.30 inch and is 5.29 feet long; tube B has an I.D of 0.45 inch and is 10/53 feet long, pipe A has an I.D of 0.50 inch and is 14.29 inches long, and Pipe B has an I.D. of 0.61 inch and is 20.45 feet long. Pressure drops across the lengths of the tubes and pipes are collected, temperatures are measured in the centers of the conduits. Viscosities are calculated and reported in FIG. 12. Additional runs conducted with 25, 50, and 75 quality foams (reflecting the amount of nitrogen), revealed excellent half lives.

Thus it is seen that our invention includes an aqueous gel comprising 5, water and, by weight based on the water, (a) 0.1% to 5% of an anionic or cationic polymer, (b) a lesser amount but at least 0.01% of a surfactant having from 8 to 22 carbon atoms and a charge opposite that of the polymer, (c) from 0.001 to 5% of a hydrophobic alcohol, (d) up to 10% of a phosphorus-containing viscosity enhancer, (e) up to 5% of an amphoteric surfactant, and (f) up to 5% of an amine oxide, the gel having a Zeta Potential of an absolute value of at least 20, millivolts. In another aspect, our invention is a method of making an aqueous gel comprising adding to water 0.1% to 5%, by weight based on the water, cationic polymer and a lesser amount but at least 0.01% by weight of an anionic surfactant having from 8 to 22 carbon atoms, in the presence of 0.001% to 5% linear or branched alkyl alcohol of the general formula $C_MH_{2M+2-N}(OH)_N$, where M is a number from 6-23, and N is 1 when M is 6-12, but where M is 13-23, N may be a number from 1 to 3, and optionally in the presence of at least one of (a) up to 5% by weight amphoteric surfactant and (b) up to 5% by weight amine oxide, the ratio of the cationic polymer to the anionic surfactant being effective to provide a Zeta Potential having an absolute value of at least 20 millivolts. Further, our invention includes an aqueous gel comprising a polymer in an amount no greater than 1% by weight in water, characterized by a "10/100 20/40" settling rate result at 60 minutes of no more than 8 millimeters, preferably no more than 7 millimeters. Stated another way, our invention includes an aqueous gel comprising no more than 1%, preferably no more than 0.7%, water soluble polymer, the gel having a zero shear viscosity of at least 45,000 following the zero shear viscosity extrapolation procedure of Asadi, Conway and Barree in SPE 73755 or, expressed another way, characterized by a "10/100 20/40" settling rate result at 60 minutes of no more than 8 millimeters, preferably no more than 7 millimeters.

The invention further includes the use of the described gels as plugs or pigs in pipes. By pipes, we mean any duct, conduit or pipe in which a gel plug or pig can be formed, where the phosphorus-containing compound increases gel viscosity improving plug and pig properties. The gel plug or pig is generally used as described above and in U.S. Pat. Nos. 5,537,700, 5,346,339, 4,252,465, 5,483,986, 4,543,131, 4,473,408, 6,076,278, 5,346,011, and 4,767,603, all of which are incorporated herein in their entireties. The gel plug or pig is formed in a sealing relationship to the pipe and to the fluids on either side of it. It may itself form a segment of material moving through the pipe. Any convenient length may be used so long as there is enough gel to form a substantially sealing relationship (that is, to substantially prevent the mixing of the fluids it separates) with the pipe. In another aspect, our invention includes a method of separating two portions of fluid for movement in a pipe comprising placing between the portions of fluid in the pipe an aqueous gel separating pig comprising a water-soluble polymer in an amount no greater than 1% by weight, having at least one of (a) a zero shear viscosity of at least 45,000 following the zero shear viscosity extrapolation procedure of Asadi, Conway and Barree in SPE 73755, or (b) a "10/100 20/40" settling rate result at 60 minutes of no more than 8 millimeters. The separate portions of fluid may be used to transport cleaning fluids, drying fluids, well cementing fluids, and any other fluid for maintenance of a pipeline or for the placement of a specialized fluid in a desired location in the pipe system. The plug or pig may be used to separate portions or segments of fluids—for example, one segment may be a gas and the other a liquid; one may be a hydrocarbon and the other an aqueous fluid. In any case, the use of our pigs will facilitate the movement of such separated or isolated fluids through a pipe.

EXAMPLES 1-4

Examples 1-4 illustrate the formation of Zeta gels having different weight percentages of the phosphorus-containing compound tri-n-butyl phosphate.

Crosslinker/Anionic Portion of the Gel 1 wt. %, 2.5 wt. %, 4 wt. %, and 6 wt. % of tri-n-butyl phosphate were added to WGA 300W to form a crosslink/anionic portions to form WGA 300WTBP1, WGA 300WTBP2, WGA 300WTBP3, and WGA 300WTBP4. WGA 300W comprises 20 wt. % Sodium Lauryl Sulfate, 20 wt. % isopropyl alcohol (IPA), and 60 wt. % water, an available from Weatherford, Inc. of Houston, Tex.

Gellant/Cationic Portion of the Gel

The gellant or WGA-305, comprises of 81 wt. % high molecular weight polyDadmac 8.77 wt. %, Coco Betaine, and 9.97 wt. % Coco amine oxide, an available from Weatherford, Inc. of Houston, Tex.

Mixing

Using a Waring® blender set at 30% power with a variac, the gellant was initially added to 300 mL of tap water and mixed for 30 seconds to a minute. The four solutions were then each added to the gellant. Gelling occurs within 10-20 seconds.

Loadings 1.2 wt. % gellant or 12 gpt (gallons per thousand gallons) of WGA 305 with 0.35 wt. % or 3.5 gpt (gallons per thousand gallons) WGA 300W, WGA 300WTBP1, WGA 300WTBP2, WGA 300WTBP3, and WGA 300WTBP4. Ratios roughly around 4:1 can be used, although previous testing has shown by dropping the pH, closer to 1:1 ratios can be achieved. Overall, the gelling system is flexible except putting the anionic portion of the gel in excess of the cationic, i.e., portions are adjusted so that the cationic component portion is equal to or greater than the anionic component portion.

Testing:

Viscosity tests were run on a Fann 50 SL Viscometer at ambient temperature, 40 reciprocal seconds' sheer rate, and 400-500 psi of pressure. The tests determined that by adding an optimal loading of tri-n-butyl phosphate to the anionic portion of the gel, much higher viscosity was obtained.

Figure 13:
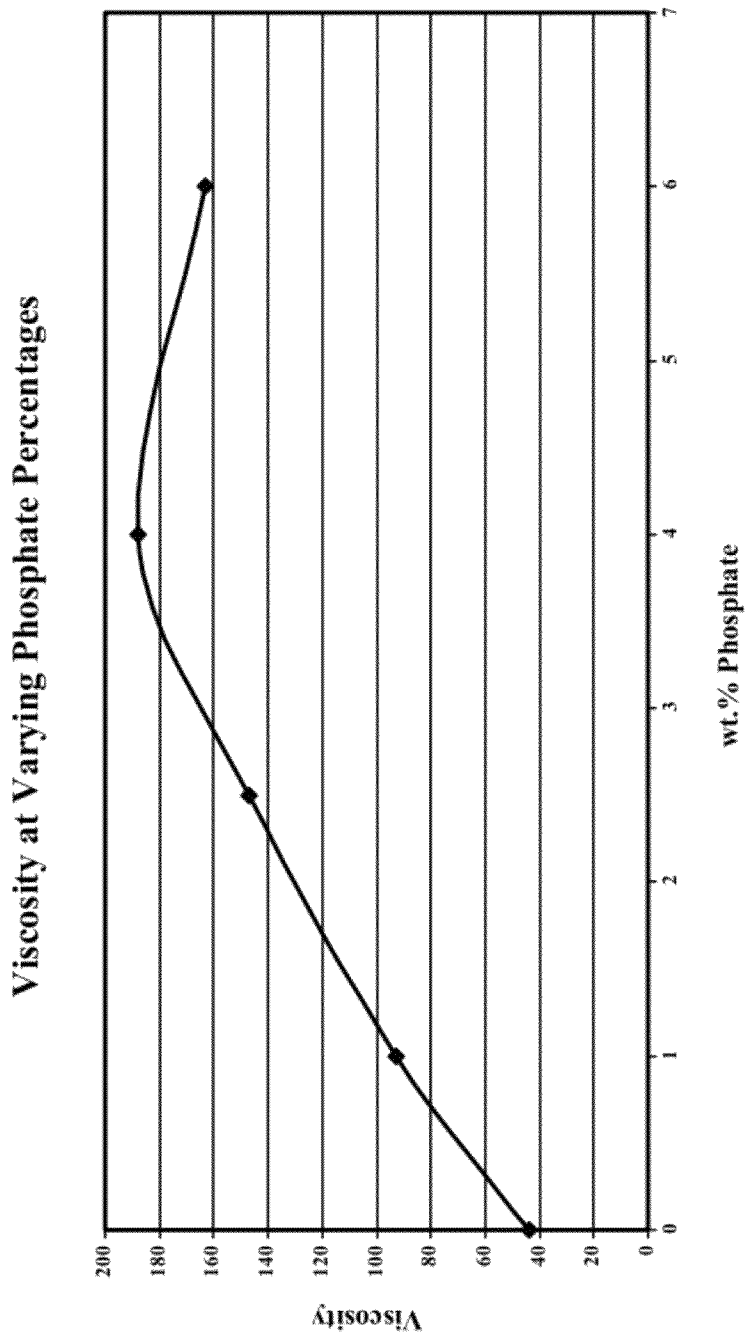
FIG. 13 depicts a plot of final gel viscosity of the gels of this invention at varying weight percentages of added tri-n-butyl phosphate.
Figure 14:
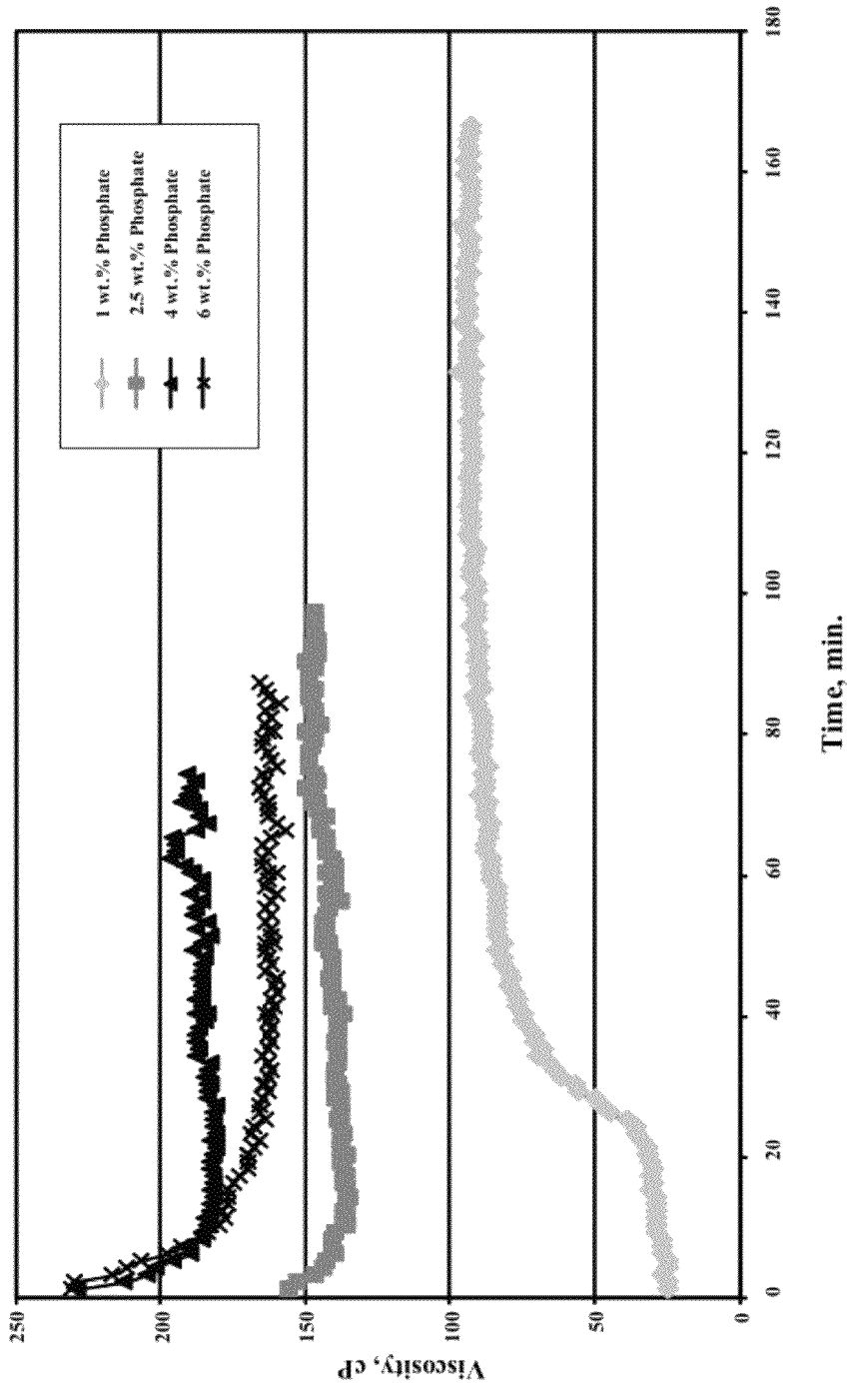
FIG. 14 depicts a plot of viscosity changes with time of the gels of this invention at varying weight percentages of added tri-n-butyl phosphate.

Referring now to FIG. 13, a plot of final gel viscosity of the gels of this invention at varying weight percentages of added tri-n-butyl phosphate. It is apparent from FIG. 13 that the addition of tri-n-butyl phosphate in concentration ranging from 1 wt. % to 6 wt. % significantly increases the final viscosity of the gel. It is also apparent that the viscosity increase seems of show a maximum at about 4 wt. %. However, this trend may be for this specific gellant and may be different for other gellant formulations. FIG. 14 depicts a plot of viscosity changes with time of the gels of this invention at varying weight percentages of added tri-n-butyl phosphate. Again, the data shows an apparent maximum viscosity increase at about 4 wt. %.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. An aqueous gel comprising:
   a water-soluble cationic polymer in an amount no greater than 1% by weight,
   an anionic surfactant in an amount less than that of the polymer, and
   a phosphorus-containing compound in an effective amount between about 0.001 wt % and about 10 wt. %,
   where the phosphorous-containing compound is selected from the group consisting of mono-alkali metal phosphate $(PO(OH)(OM))$, where M is Li, Na, K, Rd, or Cs, di-alkali metal phosphate $(PO(OH)(OM)_2)$, where each M is the same or different and is Li, Na, K, Rd, or Cs, tri-alkali metal phosphate $(PO(OM)_3)$, where each M is the same or different and is Li, Na, K, Rd, or Cs, carbyl phosphate $(PO(OR)(OM)_2)$, where R is a carbyl group and each M is H, Li, Na, K, Rd, or Cs, dicarbyl phosphate $(PO(OR^1)(OR^2)(OM))$, where $R^1$ and $R^2$ are the same or different carbyl groups and M is H, Li, Na, K, Rd, or Cs, tricarbyl phosphate $(PO(OR^1)(OR^2)(OR^3))$, where $R^1$, $R^2$, and $R^3$ are the same or different carbyl groups, or mixtures or combinations thereof,
   where the polymer and the anionic surfactant form a coacervate gel and where the effective amount is sufficient to increase a gel viscosity of the composition, increase a viscosity build up of the composition, and increase gel stability of the composition and where the composition is characterized in that the composition has
   a zero shear viscosity of at least 45,000 or
   a settling rate of no more than 8 millimeters measured by adding 10 mL of 20/40proppant to 100 mL of a 1.1 wt. % gel maintained at 80° C. in a 100 mL graduated cylinder and measuring a depth in millimeters of the gel from a top of the graduated cylinder.

2. The gel of claim 1, wherein the water-soluble polymer is present in the gel in an amount no greater than 0.7%.

3. A well treatment fluid comprising a proppant and a gel of claim 2.

4. The gel of claim 1, further a hydrophobic alcohol.

5. The gel of claim 4, further comprising:
   a gel promoter comprising one or more of an amphoteric surfactant and/or an amine oxide surfactant, while maintaining a Zeta Potential value greater than or equal to 20 millivolts or less than or equal to -20 millivolts.

6. The gel of claim 1, wherein the phosphorus-containing compound in an amount between about 0.05 wt. % and about 3 wt. %.

7. The gel of claim 1, wherein the effective amount of the phosphorus-containing compound is between about 0.05 wt. % and about 1 wt. %.

8. The gel of claim 1, further comprising:
   a gel promoter comprising one or more of an amphoteric surfactant and/or an amine oxide surfactant, while maintaining a Zeta Potential value greater than or equal to 20 millivolts or less than or equal to -20 millivolts.

9. The gel of claim 1, wherein the phosphorous-containing compound comprises tricarbyl phosphate $(PO(OR^1)(OR^2)(OR^3))$, where $R^1$, $R^2$, and $R^3$ are the same or different carbyl groups, or a mixture of tricarbyl phosphates.

10. The gel of claim 1, wherein the $R^1$, $R^2$, and $R^3$ groups are the same or different the alkyl groups having from about 4 to about 12 carbon atoms.

* * * * *